(12) United States Patent
Geller

(10) Patent No.: US 11,930,787 B2
(45) Date of Patent: Mar. 19, 2024

(54) METHOD AND SYSTEM FOR DOG TRAINING

(71) Applicant: Tamar Geller, Los Angeles, CA (US)

(72) Inventor: Tamar Geller, Los Angeles, CA (US)

(*) Notice: Subject to any disclaimer, the term of this patent is extended or adjusted under 35 U.S.C. 154(b) by 214 days.

(21) Appl. No.: 17/693,247

(22) Filed: Mar. 11, 2022

(65) Prior Publication Data

US 2023/0284591 A1 Sep. 14, 2023

(51) Int. Cl.
*A01K 15/02* (2006.01)

(52) U.S. Cl.
CPC ..................... *A01K 15/02* (2013.01)

(58) Field of Classification Search
CPC .... A01K 15/02; A01K 15/021; A01K 15/022; A01K 15/023; A01K 15/029; A01K 15/04
See application file for complete search history.

(56) References Cited

U.S. PATENT DOCUMENTS

| | | | | |
|---|---|---|---|---|
| 6,166,643 A | * | 12/2000 | Janning | A01K 15/023 119/908 |
| 10,172,325 B1 | * | 1/2019 | Landers | A01K 15/023 |
| 10,251,371 B1 | * | 4/2019 | Landers | G06N 5/04 |
| 10,292,365 B1 | * | 5/2019 | Landers | A01K 15/023 |
| 11,246,291 B1 | * | 2/2022 | Landers | A01K 15/023 |
| 2011/0017149 A1 | * | 1/2011 | Mushenski | A01K 15/022 119/719 |
| 2012/0240863 A1 | * | 9/2012 | Araujo | A01K 5/02 119/51.01 |
| 2013/0233246 A1 | * | 9/2013 | Wang | A01K 15/025 119/51.01 |
| 2014/0048017 A1 | * | 2/2014 | Mainini | A01K 15/02 119/51.01 |
| 2018/0184618 A1 | * | 7/2018 | Gotts | A01K 27/009 |
| 2020/0267941 A1 | * | 8/2020 | Seltzer | A01K 15/022 |
| 2020/0375149 A1 | * | 12/2020 | Anderton | A01K 15/023 |
| 2021/0251191 A1 | * | 8/2021 | Lee | A01K 15/021 |

* cited by examiner

*Primary Examiner* — Trinh T Nguyen

(74) *Attorney, Agent, or Firm* — Omni Legal Group; Omid E. Khalifeh; Ariana Santoro

(57) ABSTRACT

A system and method for training a dog is provided which teaches the dog to ignore stimuli, respond to a person when called by name, retreat, and socialize, as core behaviors. For each core behavior, the method comprises progressively challenging the dog and introducing a distinct auditory signal associated with each of the core behaviors so that when the auditory signal is given, the dog performs the associated core behavior. Additional or superfluous use of auditory signals is reduced or altogether avoided to prevent the dog's desensitization to each auditory signal. As such, the system for training a dog comprises a dog, a boundary, a valued item, and an auditory signal which may each be variously engaged according to the methods disclosed herein.

12 Claims, 8 Drawing Sheets

METHOD AND SYSTEM FOR DOG TRAINING

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to methods of animal training, and more particularly to methods for reducing unwanted and even aggressive behavior in dogs by progressively emphasizing acceptable behaviors and interests.

BACKGROUND

In popular culture, dogs have often been thought to observe a pack social structure in which a dominant "alpha" member of the pack exercises relatively high influence over other members of the pack. That is, it has been believed that the alpha member assumes preferential access to resources over other members, and the alpha's feeding and aggressive behaviors are rarely influenced by other members of the pack. Many domestic dog training programs and methods rely on this understanding of canine social behavior and employ various audio and visual commands to render the owner and/or trainer as the alpha member of the—metaphorical—domestic pack. For instance, some have proposed physically pinning or immobilizing a pet dog into submission when it shows aggression or unwanted dominance in an effort to establish the trainer as the alpha member of the human-dog pack.

Various proposals to support animal and, in particular, dog training have been proposed. For instance, U.S. Pat. No. 9,693,536 to Dana teaches a geofence boundary, updated in accordance with the location of an owner's mobile electronic device, and configured to detect the presence of a dog collar. When the dog collar is outside of the geofence boundary, the collar is configured to "correct" the dog by way of a surprising vibration, audio alert, shock, or more harsh correction stimulus. Providing a negative correction stimulus supposedly deters a dog from leaving the close proximity of their owner and their mobile electronic device, however, as noted above, this negative correction stimulus can be counter-productive in dog training. Similarly, U.S. Pat. No. 9,675,051 to Bonge and U.S. Pub. No. 2017/0135315 by Marmin et al. disclose animal-worn collars having multiple vibration and/or force components, and even a shock generator and spraying functionality.

In addition to potentially causing fear and anxiety in a dog, none of these solutions support a loving relationship between an owner and dog. Moreover, these and other proposals, that rely on dominance, pain, discomfort, and surprise for training, overlook the fact that left to their own devices, and in the absence of food and resource insecurity, dogs tend not to force one another into submission. Instead, they display submissive behaviors of their own accord. When a trainer employs confrontational and dominant punishment-based methods to reduce unwanted behaviors, a dog may seem to comply, but because their obedience may be the result of fear and even pain, such methods can lead to additional anxiety and fear in the dog, which of course risks increasing unwanted aggressive and dominant behaviors. In that light, some have suggested that aggressive training techniques based on the alpha structure and which involve physical correction not only misapplies canine social behaviors to the human-dog relationship, but is also counter-productive to fostering a peaceful and positive relationships.

Thus, there remains a need for dog training methods that avoid fear, punishment, and dominance to reduce unwanted behaviors through the progressive. Although various proposals have been made to solve the problem of unwanted and even dangerous dog behavior, none of those in existence combine the characteristics of the present invention.

SUMMARY

The present disclosure is directed to for improving the following core behaviors in a dog: ignoring stimuli, responding to a person when called by name, retreating, and socializing. For each core behavior, the method comprises progressively challenging the dog and introducing a distinct auditory signal associated with each of the core behaviors so that when the auditory signal is given, the dog performs the associated core behavior. As such, the system for training a dog comprises a dog, a boundary, a valued item, and an auditory signal which may each be variously engaged according to the methods disclosed herein.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In one embodiment, a method for improving a dog's impulse control comprises steps for teaching it to ignore certain stimuli without sounding any precursory commands generally associated with traditional methods of dog training. In general, this involves a boundary in front of the dog, a first value item placed in line with the boundary and to the side of the dog, and a greater number of the valued item obscured from the dog's view at a target location across the boundary in front of the dog. When the dog ignores the first valued item and turns its attention to the target location across the boundary, the obscured greater number of similar valued items may be provided together with a positive auditory signal. Once successfully completed, these steps may be repeated by placing the first valued item on another side of the dog in line with the boundary. In this manner, the dog may be conditioned to associate ignoring a known stimulus, the first valued item, with a certain positive auditory signal and the provision of heretofore unknown valued items.

In an embodiment, the first valued item may be obscured whenever the dog shows interest in it, interacts with it, or even attempts to ingest it.

It is contemplated that the method may be arranged to progressively challenge the dog. For instance, the first valued item may be placed on the ground, above the ground, and even tossed as a moving stimulus from some distance above the ground. In some embodiments, the dog may be finally challenged to ignore stimuli by moving himself That is, rather than providing a boundary in front of the dog, the dog may be in motion, such as on a walk or playing, and a valued item may be placed or thrown. When the dog ignores the valued item in such a situation and turns its attention to the target location even while in motion itself, the greater number of valued items at the target location may be provided together with the auditory signal.

It is contemplated that the target location associated with the obscured greater number of valued items may be the dog's trainer.

In some embodiments, the valued item(s) may be a particularly desirable treat or food item, but it is contemplated that the valued item(s) may be any item seemingly desirable or rewarding to the dog, such as a loved toy.

The auditory signal may be a word or phrase uniquely associated with the core behavior. In the case of ignoring stimuli, the auditory signal may be the phrase "ignore it" or similar. In some embodiments, the auditory signal may be any particular, repeatable sound or tone, digital or analogue, as may be desired. It is contemplated, however, that the only auditory input provided in the method is the auditory signal provided simultaneously with providing one or more valued items.

Another core behavior addressed by the method is responding to a person when called by name. In such method, the auditory signal may be the dog's name, which should be emitted only when the core behavior is expressly elicited. It is contemplated that overuse or even imprecise emission of the dog's name or other auditory signal associated with this core behavior may desensitize the dog to the auditory signal. As such, limiting use of the auditory signal—largely or even only—to those instances where the core behavior is desired or warranted, in accordance with the manner and methods disclosed herein, will ensure reliable performance of such core behavior.

It is contemplated, however, that additional emission of the dog's name directly to the dog, independent of eliciting the core behavior, may be made in order to more generally create a positive association between the dog and its owner or trainer and, as a result, make it more likely that the dog will relate the core behavior of responding when called with such positive association. To do so, and in accordance with some embodiments, emission of the dog's name or other auditory signal may be limited to those situations in which the dog is being directly addressed by the owner or trainer. In other words, emission of the dog's name may be avoided when being referred to incidentally or to third parties. A nickname or other auditory signal may be emitted instead to avoid unintentionally triggering performance of a core behavior or otherwise unintentionally gaining the dog's attention.

As a progressive challenge to the core behavior of responding when called by name, the method comprises first providing a valued item simultaneous with the auditory signal; providing a plurality of valued items when the dog approaches a visible target location following the auditory signal; providing a plurality of valued items when the dog approaches a remote target location following the auditory signal; providing a plurality of valued items with the dog approaches a heretofore obscured target location following the auditory signal; and providing a plurality of plurality of valued items when the dog approaches a target location following the auditory signal when provided in an unfamiliar environment.

Still another core behavior addressed by the method is retreating. In some aspects, this is another method for improving a dog's impulse control. In an embodiment, a valued item may be obscured at a target location very close to the dog. When the dog retreats at all from the target location, an auditory signal may be given together with the valued item. In such an embodiment, the auditory signal may be the phrase "back off" or "out" or the like, or any other distinct and repeatable sound. The method may be arranged to progressively challenge the dog by moving the target location. In some embodiments, the method may further comprise crowding the dog from a front, right, and left sides so that it is only possible for the dog to retreat in a single direction. In some embodiments, the method may further comprise an additional auditory signal in the event that the dog seeks out or attempts to interact with or take the obscured valued item, however, in such cases, the method will comprise continued concealment of the valued item. Still, it is contemplated that in general, an auditory signal will be provided in response to successful performance of the core behavior simultaneously with provision of one or more valued items. In this manner, it is contemplated that the dog will associate auditory signals with positive experiences only and thus be conditioned to perform the core behaviors on demand.

The method even further comprises steps for socializing the dog. In an embodiment the method comprises means for progressively desensitizing the dog to unfamiliar sights, sounds, and experiences including but not limited to differently sized, shaped, colored, and aged people, children, animals, and objects such as vehicles, plant matter, mirrors, and limitless other unfamiliarities. In one embodiment, the method may comprise means for distracting the dog, such as a gentle spray water bottle. The method may comprise introducing the dog to another, low energy dog and providing a spray of water to distract the dog if it is too close or becoming dominant over the another dog. In the event that an unfamiliar child or adult is in the vicinity of the dog, the method comprises ignoring the dog and then issuing a distinct, repeatable auditory signal when the dog displays comfort in the child or adult's presence. In some embodiments, the auditory signal may be the word "friend" or "courage" or something similarly short and readily recognizable. In an embodiment, it is contemplated that this method reduces stimulation from potentially unknown or discomforting sources in order to improve the dog's comfort and ultimately desensitize the dog to later-encountered unknown or discomforting sources.

In all embodiments, it is contemplated that the auditory signal will be selected to elicit a positive feeling and response in the dog. That is the auditory signal may be generally considered happy, positive, safe, constructive, and/or nonthreatening. Additionally, the auditory signal, unless otherwise stated, is provided only in conjunction with performance of the core behavior in an effort to avoid desensitizing the dog to the auditory signal and to strongly associate each auditory signal with its related core behavior.

It is contemplated that this feature in the method will reduce the introduction of superfluous and potentially confusing auditory input as well.

It is contemplated that the method and system for dog training according to the disclosure and claims provided below may beneficially reduce unwanted and even dangerous dog behaviors, such as for example only and not limitation, straying from a human or owner, refusing to come when called, displaying dominance or aggression, crowding, lunging, and jumping amongst limitless others. The method addresses what the inventor considers five (5) core needs of a dog, namely, certainty, which is supported by consistent emission of the auditory signals and valued items in a positive manner; reduced uncertainty, which is likewise supported by consistency as described; love and connection fostered by positive rather than punitive interactions with the dog; significance; and growth reflected in the successful performance of each core behavior over time.

One or more of the above-disclosed embodiments, in addition to certain alternatives, are provided in further detail below with reference to the attached figures. The disclosed subject matter is not, however, limited to any particular embodiment disclosed.

Figure 1A:
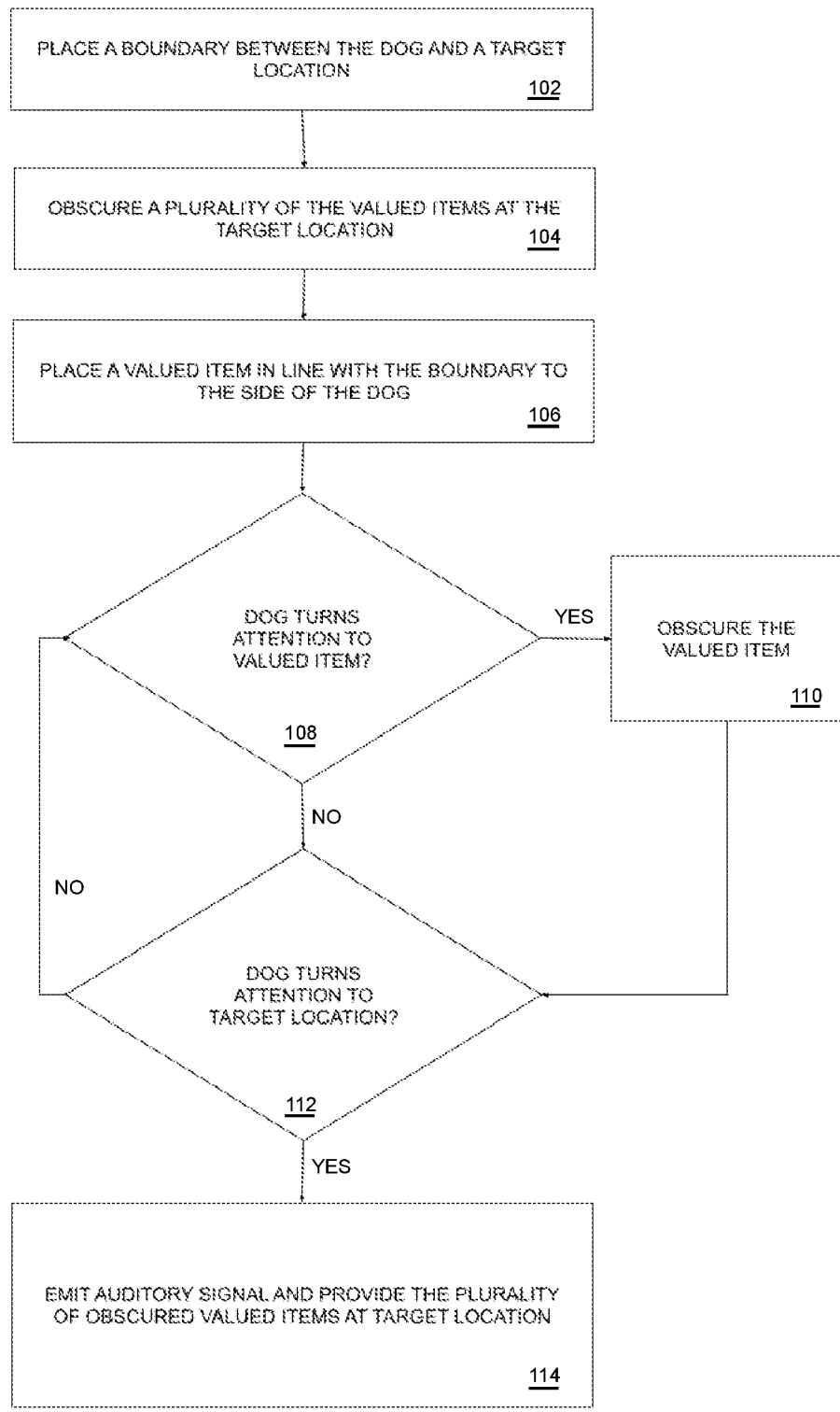
FIGS. 1A-1D show flowchart illustrating certain aspects of an exemplary embodiment of a method for dog training.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

As noted above, the method and system for dog training are configured to elicit the following core behaviors in a dog: ignoring stimuli, responding when called, retreating, and socializing. FIGS. 1A-D illustrate progressively challenging systems and methods to support the core behavior of ignoring stimuli. In general, the method is configured to associate a human or trainer, for instance, with unknown valued items such that connection with and attention to the human or trainer may be considered rewarding or more desirable than attention to a known valued item. More particularly, and with attention first to FIG. 1A, the method comprises the steps of placing a boundary between the dog and a target location (block 102). The target location may be, for example, the location occupied by the dog's owner or trainer or even a particular feature of such dog's owner or trainer. In some embodiments, though, it is contemplated that the target location is separate and apart from the dog's owner or trainer. Such target location may be, for instance, a particular landmark or piece of furniture such as a crate, fence, table, or any other target location as may be desired. In any case, it is contemplated that the dog and target location may be separated from one another by some boundary.

Figure 2:
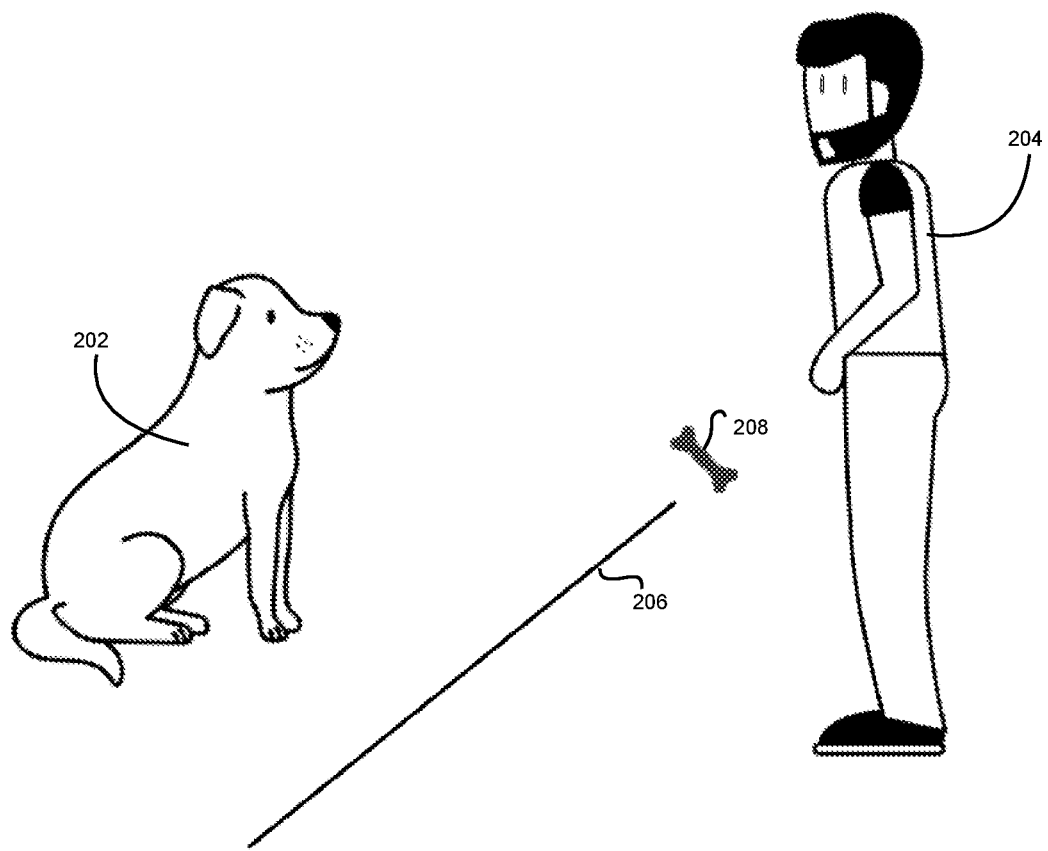
FIG. 2 is a diagram illustrating an exemplary embodiment of the method for dog training.

FIG. 2 shows an exemplary diagram illustrating certain aspects of the method in FIG. 1A. Namely, a dog 202 faces a person as a human target location 204 across a boundary 206, which may be any of a physical rope, stick, or other divider or even a drawn or imaginary line separating the two. A valued item 208 such as an edible treat is placed in line with the boundary 206, that is, between and to the side of the dog 202 and target location 204.

Returning to FIG. 1A, the method further comprises obscuring a plurality of valued items, such as treats or toys, at the target location (block 104), and placing a valued item in line with the boundary and to the side of the dog (block 106). If the dog turns its attention to the valued item (block 108), such valued item may be obscured (block 110), by hand or by some other concealing article such as a hat, towel, jacket, or other means, until the dog's attention turns away from the valued item again. If the dog turns its attention away from the valued item and toward the target location (block 112), then the method will comprise emitting an auditory signal simultaneous with providing the dog with the plurality of obscured valued items at the target location (block 114).

In some embodiments, the plurality of valued items, such as exemplary treats, may be obscured on the body of a human target location. For instance, the plurality of valued items may be obscured in such a human's hand, pocket, or even a pouch held or worn by the human. In the event that the target location is inanimate, the plurality of valued items may be obscured in any way desirable, such as by placing them in a lidded and opaque container or covering with a cloth or other element. Thus, it will be recognized that the precise means for obscuring the plurality of valued items will not limit the invention.

Likewise, the precise auditory signal associated with the core behavior of ignoring stimuli will not limit the invention. In one embodiment the auditory signal may be the word "ignore" spoken. In another embodiment, the auditory signal may be a musical tone or other sound emitted from a device.

Figure 1B:
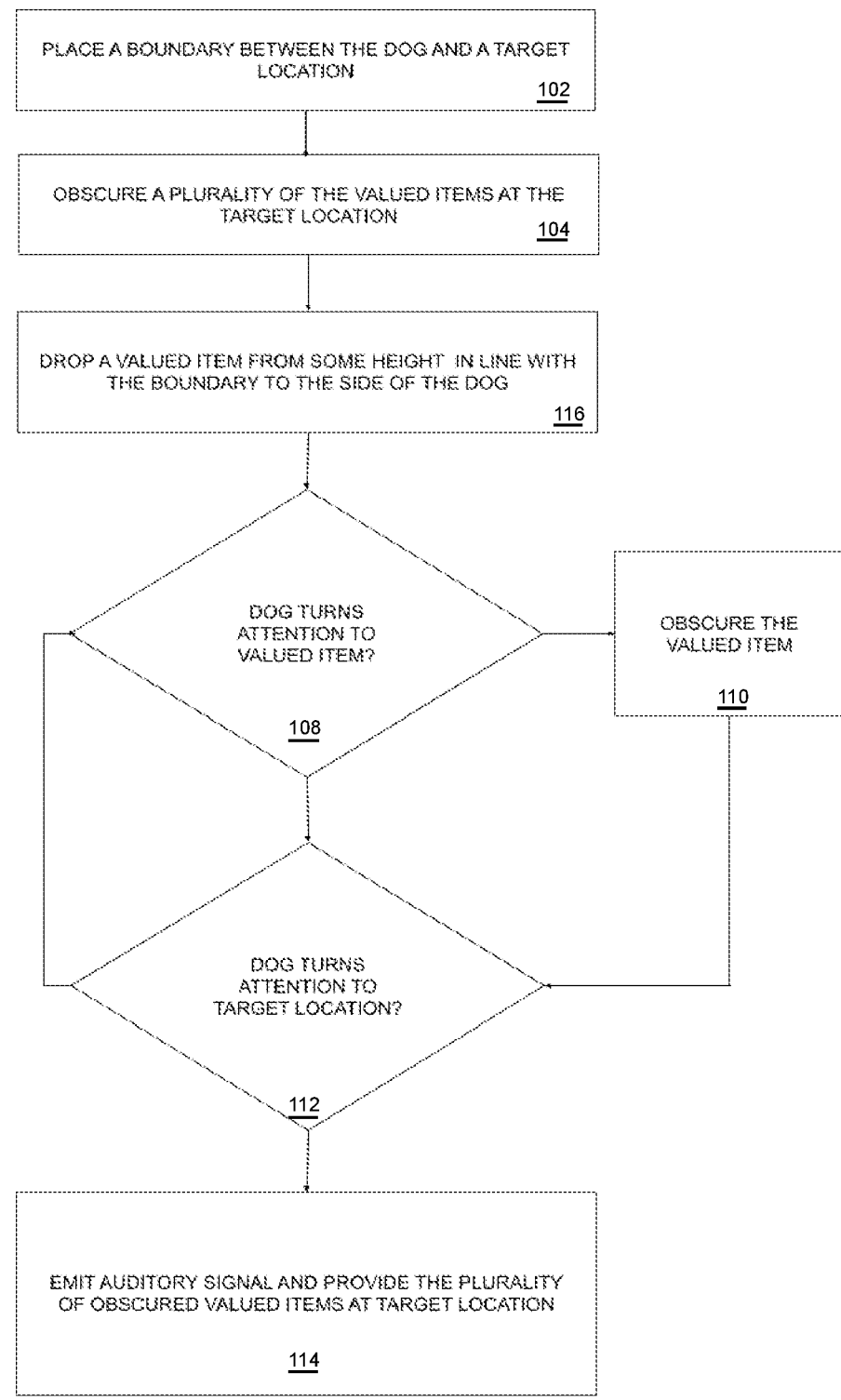
Figure 1C:
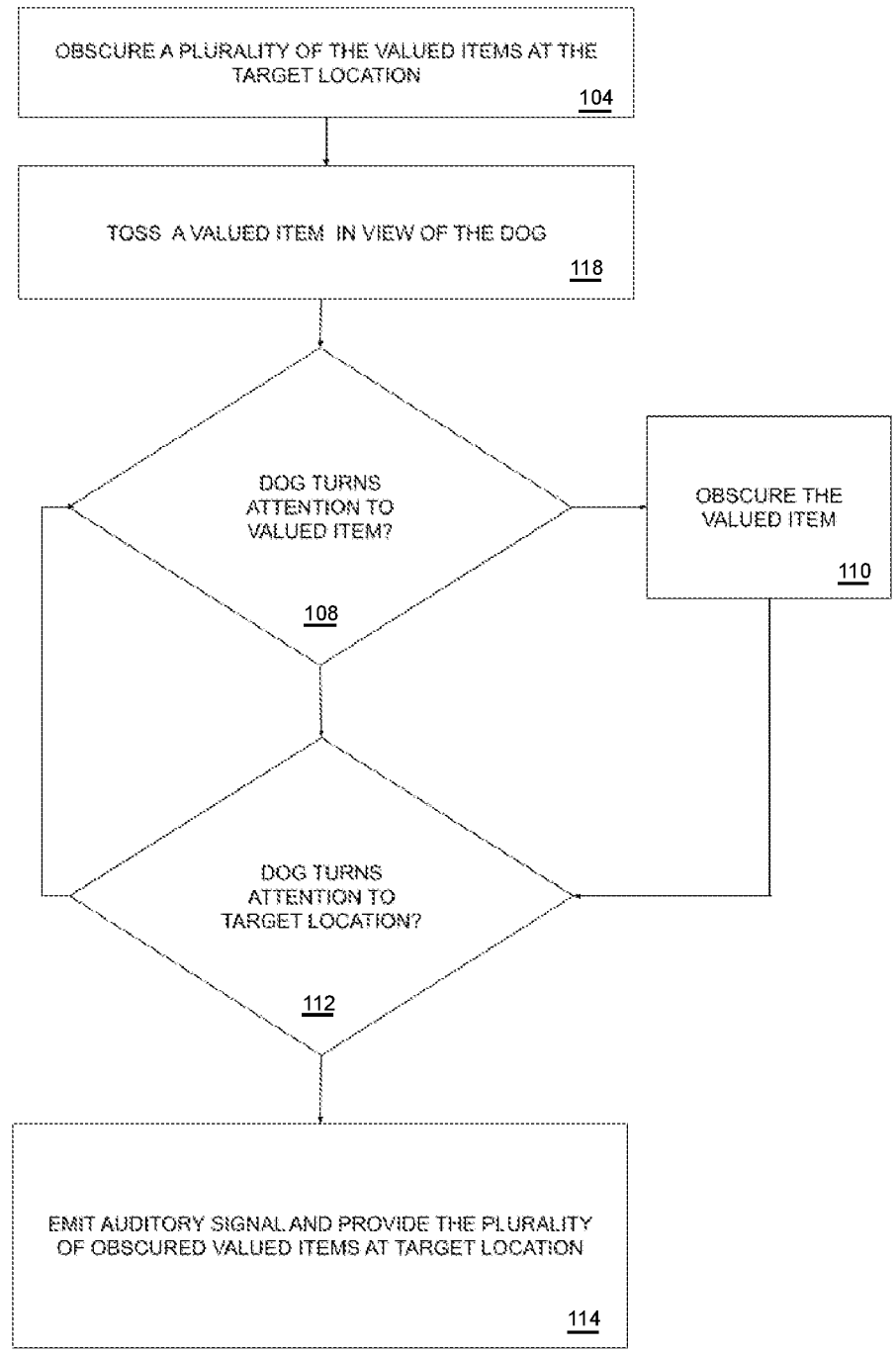
Figure 1D:
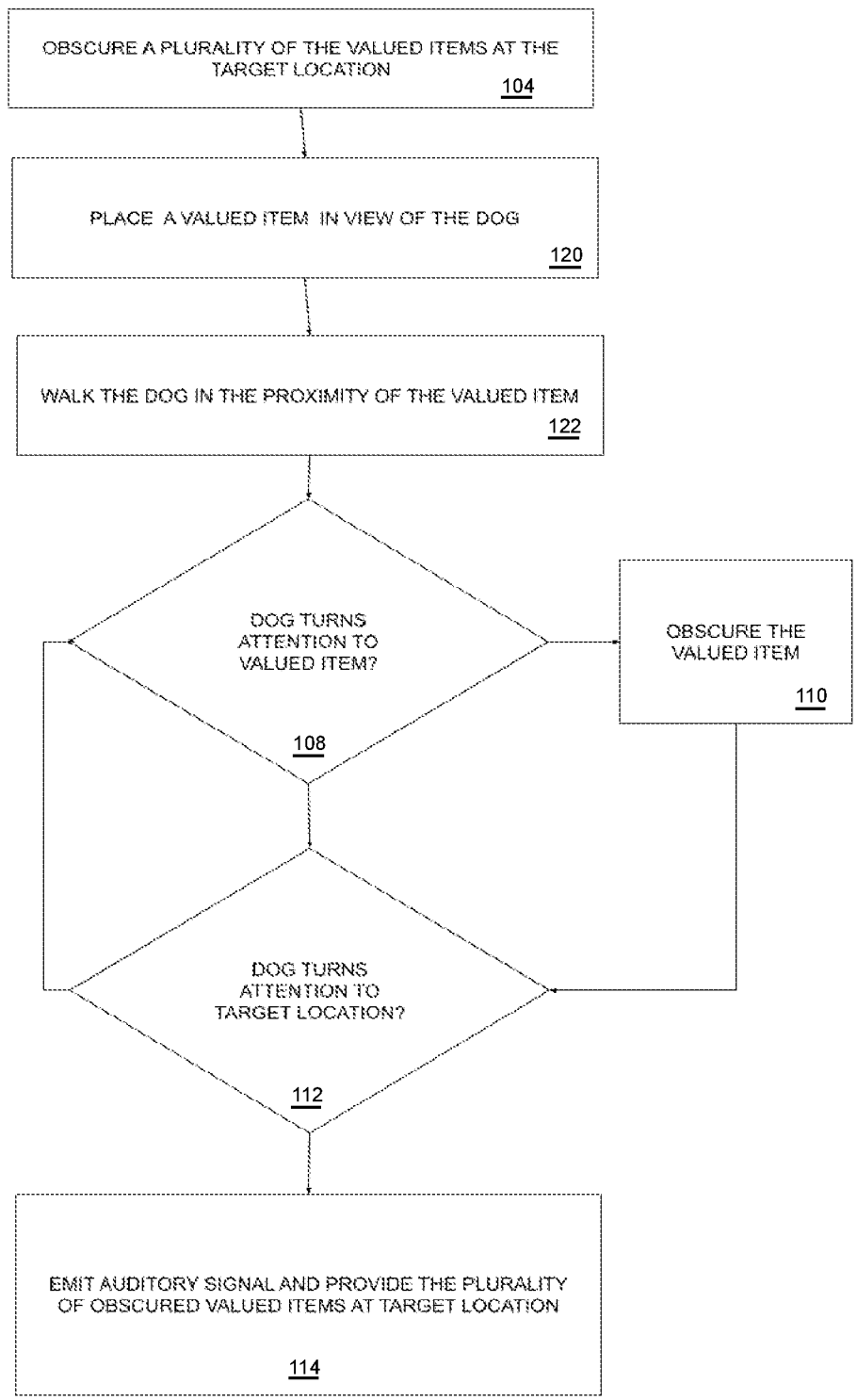

FIGS. 1B-1D illustrate progressive challenges to the method shown in FIGS. 1A and 1n the diagram of FIG. 2. With reference to FIG. 1B, in particular, it may be seen that following placing a boundary between the dog and a target location (block 102) as well as obscuring a plurality of the valued items at the target location (block 104), described above, a valued item may be dropped from some height to the side of the dog but in line with the boundary between the target location and dog (block 116). This renders the valued item as a moving stimulus, which may be more difficult for the dog to ignore in favor of the target location. As with reference to FIG. 1A, in the method show in FIG. 1B, if the dog's attention is turned toward the valued item (block 108)

the valued item may be obscured (block 110). If the dog's attention is turned toward the target location (block 112), then the method will comprise emitting an auditory signal simultaneous with providing the dog with the plurality of obscured valued items at the target location (block 114).

In each method described above, it is contemplated that the valued item may be placed to one side of the dog, and when successful, placed on the other side of the dog.

Turning to FIG. 1C, certain progressively challenging embodiments of the method for eliciting the core behavior of ignoring stimuli may occur in the absence of a boundary. More particularly, once a plurality of the valued items are obscured at a target location (block 104), a valued item may be tossed or thrown in view of the dog. Then, as above, if the dog's attention is turned toward the valued item (block 108) the valued item may be obscured (block 110). If the dog's attention is turned toward the target location (block 112), then the method will comprise emitting an auditory signal simultaneous with providing the dog with the plurality of obscured valued items at the target location (block 114).

With reference to FIG. 1D, the method may even further involve placing a valued item in view of the dog (block 120) and walking the dog in the proximity of the valued item (block 122). It will be recognized that, as above, as above, if the dog's attention is turned toward the valued item (block 108) the valued item may be obscured (block 110). If the dog's attention is turned toward the target location (block 112), then the method will comprise emitting an auditory signal simultaneous with providing the dog with the plurality of obscured valued items at the target location (block 114).

Figure 3:
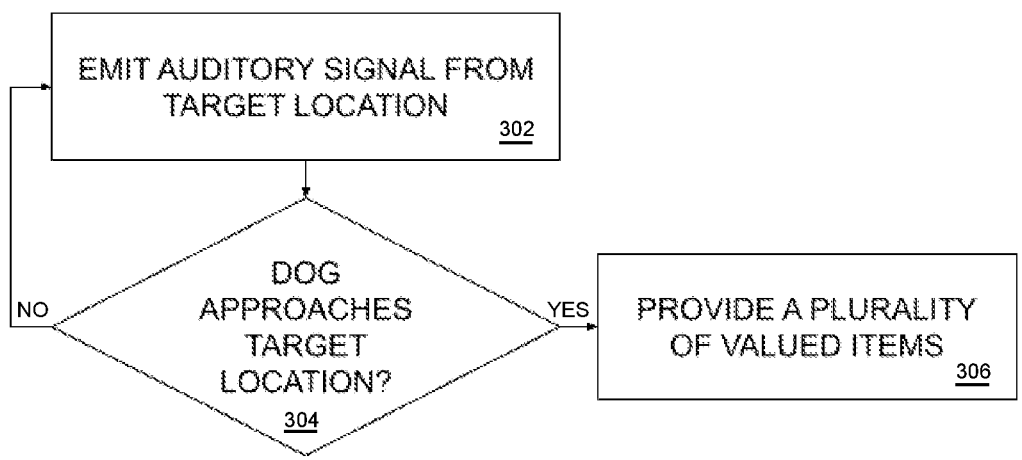
FIG. 3 shows a flowchart illustrating an aspect of an exemplary embodiment of the method for dog training.

The method and system further contemplate steps for eliciting a core behavior of responding when called, such as when called by a trainer or owner by name. In the exemplary embodiment shown in FIG. 3, an auditory signal corresponding to the core behavior of responding when called may be emitted from the outset (block 302). In some embodiments, the auditory signal corresponding to this core behavior may be the dog's name. As such, it is contemplated that emission of the dog's name is avoided outside of employment of the method. For each core behavior and corresponding auditory signal, it is contemplated that overuse or emission of such signals outside of the method steps may undesirably desensitize the dog to the auditory signals. When the dog approaches the target location (block 304) in response to the emission of the auditory signal, a plurality of valued items may be provided (block 306).

Certain alternative embodiments of this method may be provided to progressively challenge a dog as follows. First, a plurality of valued items may be provided simultaneous with the auditory signal corresponding to responding when called. Then a plurality of valued items may be provided when the dog physically approaches a visible target location following the emission of the auditory signal corresponding to responding when called. Next, a plurality of valued items may be provided when the dog approaches a remote visible target location following the emission of the auditory signal corresponding to responding when called. A remote target location could simply out of reach or at some distance but within sight from the dog. Additionally, a plurality of valued items may be provided when the dog approaches a heretofore obscured target location following the emission of the auditory signal corresponding to responding when called. This may be a visibly blocked target location such as around a corner or behind some furniture or landscape element. The method of obscuring the target location will not limit the invention. As a final challenge for eliciting a core behavior of responding when called, a plurality of valued items may be provided when the dog approaches a target location following the auditory signal corresponding to responding when called when emitted in an unfamiliar environment, such as an unfamiliar home, yard, park, landscape, or any other unknown location.

Figure 4:
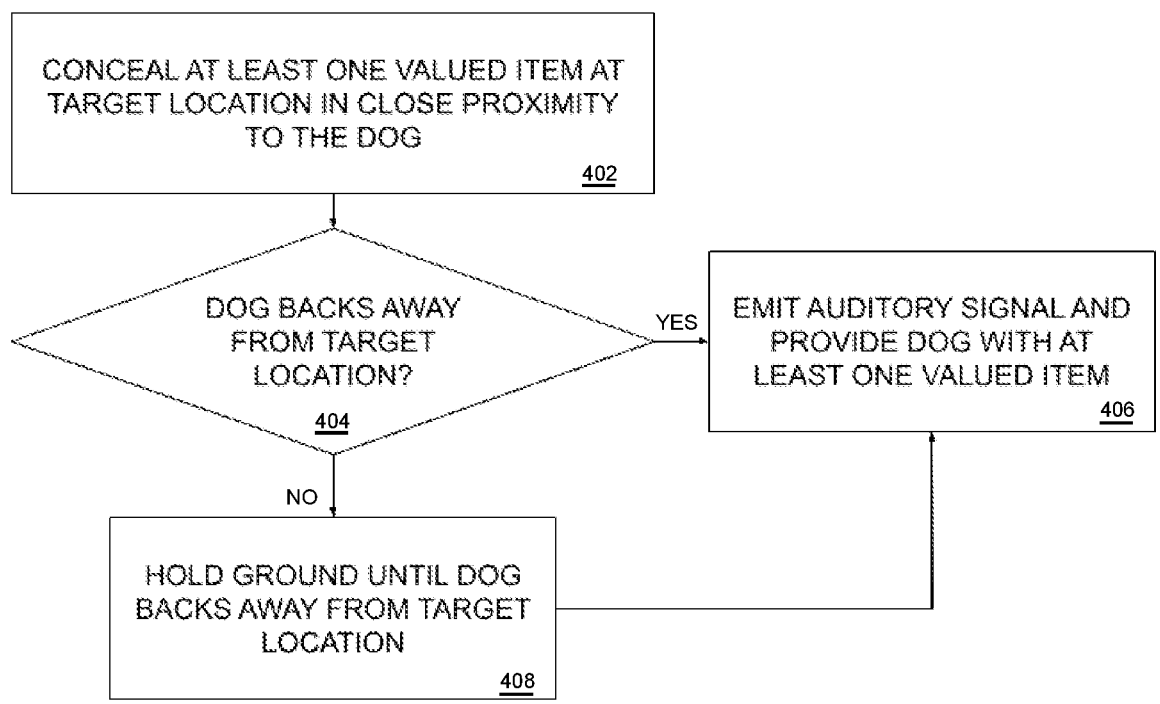
FIG. 4 shows a flowchart illustrating another aspect of an exemplary embodiment of the method for dog training.

The method and system further contemplate steps for eliciting a core behavior of retreating, such as retreating from a table full of food; retreating from crowding a child, adult or other animal; retreating from curious investigation of some item or condition, and even retreating from a potentially dangerous item or condition. An exemplary embodiment of this aspect of the method and system for dog training is sown in FIG. 4. In one embodiment, a valued item may be obscured at a target location very close to the dog (block 402). For instance, if the target location is the dog's trainer or owner, the trainer or owner may stand very close to the dog. When the dog retreats or backs away at all from the target location (block 404), an auditory signal corresponding to the core behavior of retreating may be given together with the valued item (block 406). In such an embodiment, the auditory signal may be the phrase "back off" or "out" or the like, or any other distinct and repeatable sound.

As above, this aspect of the method and system for dog training may also be arranged to progressively challenge the dog. In this case, the progressive challenge is achieved by moving the target location further from the dog.

In some embodiments, the method may further comprise crowding the dog from a front, right, and left sides so that it is only possible for the dog to retreat in a single direction. In some embodiments, the method may further comprise an additional auditory signal in the event that the dog seeks out or attempts to interact with or take the obscured valued item, however, in such cases, the method will comprise continued concealment of the valued item. Still, it is contemplated that in general, an auditory signal will be provided only in response to successful performance of the core behavior simultaneously with provision of one or more valued items in an effort to maintain the dog's attention and sensitivity toward each of the auditory signals and core behaviors.

Figure 5:
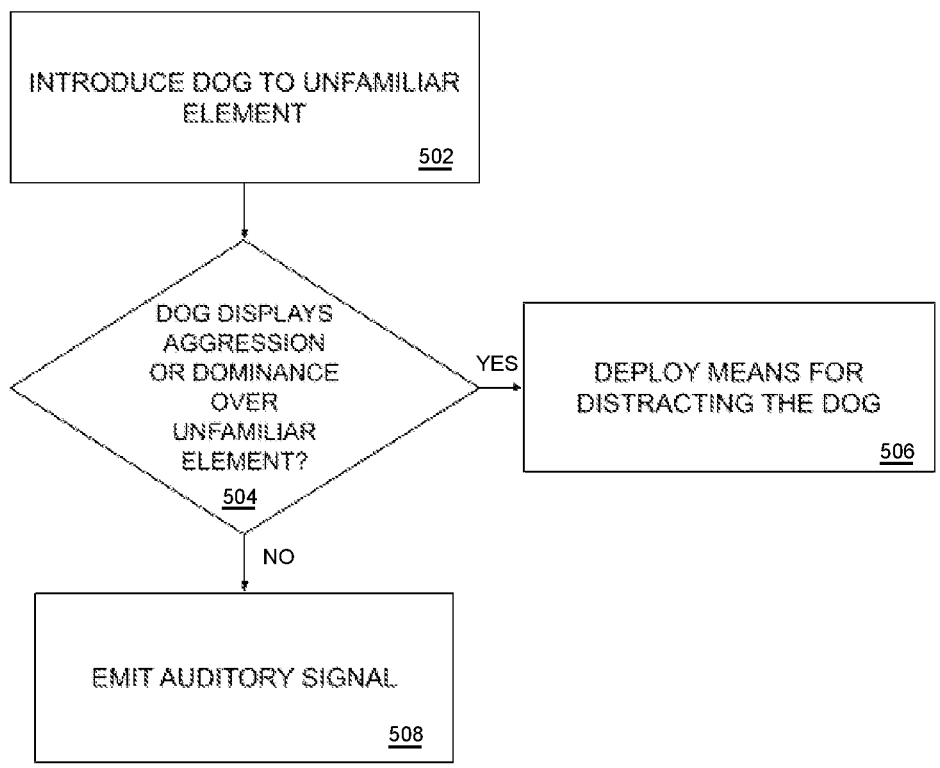
FIG. 5 shows a flowchart illustrating yet another aspect of an exemplary embodiment of the method for dog training.

Turning to FIG. 5, The method even further comprises steps for socializing the dog as a core behavior. In an embodiment, socializing may mean desensitizing the dog to unfamiliar sights, sounds, and experiences including but not limited to differently sized, shaped, colored, and aged people, children, animals, and objects such as vehicles, plant matter, mirrors, and limitless other unfamiliarities. In an embodiment, the method may comprise means for distracting the dog, such as a gentle spray water bottle. The method may comprise introducing the dog to an unfamiliar element (block 502). This may be, for instance at the lowest challenge level, a low energy dog. If the dog displays any aggressive or dominant over the low energy dog (block 504), means for distracting the dog may be deployed (block 506). For instance, the means for distracting the dog may comprise gently spraying water mist in the vicinity of the dog. In the event that the dog does not display aggressive or dominant behavior in the presence of the low energy dog, or in the presence of progressively challenging unfamiliarities or elements, and even displays comfort instead, the auditory signal may be emitted (block 508). In some embodiments, the auditory signal may be the word "friend" or "courage" or something similarly short and readily recognizable to the dog. In an embodiment, it is contemplated that this method reduces stimulation from potentially unknown or discomforting sources in order to improve the dog's comfort and ultimately desensitize the dog to later-encountered unknown or discomforting sources. To that end, it is also contemplated that any or all of the foregoing methods and systems directed at eliciting certain core behaviors may eventually occur in the presence of other dogs. For instance, the methods and systems may be performed for a plurality of dogs at a park, home or training center comprising one or more target locations as human owners or trainers.

It will be recognized that an auditory signal may be associated with each of the core behaviors addressed by the system and methods disclosed. It is contemplated that the auditory signal may be used within the method and system for dog training as a resource for eliciting the core behavior through positive reinforcement in the same manner that the valued item(s) is, as described above. As such, the auditory signal may be emitted in a more or less pleasant, joyous, or celebratory manner in order to be perceived as more or less positively associated with the core behavior, as the case may be. For example, when first introducing a core behavior, the auditory signal may be emitted according to the system method at a highest level of positivity in order to immediately reinforce positive association with the core behavior. The auditory signal may be emitted characterized with higher levels of positivity as well when eliciting performance of certain core behaviors at higher levels of difficulty. In contrast, the auditory signal may be emitted and characterized by lower levels of positivity, and even negativity, in order to evoke correction or displeasure in response to a dog's failure to adequately perform the core behavior associated with the auditory signal. Of course, the auditory signal may be emitted and characterized by apparent neutrality as well.

The level of pleasure or negativity associated with the emitted auditory signal will of course vary widely, and thus no particular mood, style, tone, emotion, or other connotative characterization of such emission will be seen to limit the invention. Still, it contemplated that emission of any additional auditory signals, such as well-known phrases generally associated with praise or even reprimand, as a response to the performance of the core behavior associated with such auditory signal should be avoided because this may desensitize the dog to the auditory signal.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the system and method for dog training with which that terminology is associated. In general, the terms used in the following claims should not be constructed to limit the system and method for dog training to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the system and method for dog training is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the system and method for dog training.

What is claimed is:

1. A method for progressively desensitizing a dog to certain stimuli, comprising:
   emitting an auditory signal corresponding to each of a core behavior comprising ignoring stimuli, responding when called, retreating, and socializing only when the dog successfully performs the core behavior, wherein steps for ignoring stimuli comprises: a) placing a boundary between the dog a target location in front of the dog; b) placing a valued item, unconcealed to the side of the dog and in line with the boundary; c) responsive to the dog approaching, showing interest in, interacting with, or attempting to ingest the valued item, covering the valued item; d) responsive to the dog turning its attention away from the valued item and toward a target location directly in front of the dog, providing a plurality of heretofore obscured valued items directly in front of the dog; e) placing the valued item on the other side of the dog and in line with the boundary; and f) repeating steps c) and d); and
   providing a plurality of a valued item concurrent with emission of the auditory signal.

2. The method of claim 1, further comprising, progressively dropping the valued item from some distance above the ground, tossing the valued item from some distance, and moving the dog near a stationary valued item, and responsive to the dog turning its attention to the target location in each case, providing a plurality of heretofore obscured valued items from a target location together with the emission of an auditory signal corresponding to ignoring stimuli.

3. The method of claim 1, wherein the auditory signal corresponding to ignoring stimuli comprises the phrase "ignore it".

4. The method of claim 1, wherein steps for retreating comprises: concealing at least one valued item at a target location in close proximity to the dog; responsive to the dog backing away from the valued item, emitting the auditory signal and providing the dog with the at least one valued item.

5. The method of claim 4, wherein the auditory signal corresponding to retreating comprises the phrase "back off".

6. The method of claim 4, further comprising distancing the target location from the dog.

7. The method of claim 4, further comprising means for crowding the dog from a front, right, and left sides so that it is only possible for the dog to retreat in a single direction.

8. The method of claim 1, wherein steps for socializing comprises introducing the dog to another dog and spraying water to distract the dog if it is too close or becoming dominant over the another dog.

9. The method of claim 8, further comprising ignoring the dog when in the vicinity of adults and children and emitting the auditory signal corresponding to socializing when the dog displays comfort in the presence of a child or adult not known to the dog.

10. The method of claim 8, further comprising emitting the auditory signal corresponding to socializing when the dog displays comfort in the presence of an unfamiliar being.

11. A method for progressively desensitizing a dog to certain stimuli, comprising:
emitting an auditory signal corresponding to each of a core behavior comprising ignoring stimuli, responding when called, retreating, and socializing only when the dog successfully performs the core behavior, wherein steps for responding when called comprises: providing a valued item simultaneous with the auditory signal corresponding to responding when called; providing a plurality of valued items when the dog approaches a visible target location following the emission of the auditory signal corresponding to responding when called; providing a plurality of valued items when the dog approaches a remote target location following the emission of the auditory signal corresponding to responding when called; providing a plurality of valued items with the dog approaches a heretofore obscured target location following the emission of the auditory signal corresponding to responding when called; and providing a plurality of valued items when the dog approaches a target location following the auditory signal corresponding to responding when called when emitted in an unfamiliar environment; and
providing a plurality of a valued item concurrent with emission of the auditory signal.

12. The method of claim 11, wherein the auditory signal comprises the dogs name.

* * * * *